United States Patent Office 2,761,312
Patented Sept. 4, 1956

2,761,312

LIQUID PHASE WATER INDICATOR

Richard A. Line, St. Louis, Mo., and Henry Hoftiezer, Schofield, Wis., assignors to Ansul Chemical Company, Marinette, Wis., a corporation of Wisconsin No Drawing. Application August 22, 1955,
Serial No. 529,942

8 Claims. (Cl. 73—53)

This invention relates to a method of determining water in liquid of low water solubilities. More specifically, the invention relates to the determination of water in halogenated refrigerants, gasoline, oils and the like.

The present invention resides essentially in the use of an indicating material consisting of white cellulosic material containing predetermined amounts of pure anhydrous cobaltous bromide which upon immersion in a liquid to be tested will indicate by its color the water content in such liquid by comparing the color of the indicating material in said liquid with standards prepared by immersing samples of the same indicating material in the same liquid at known water contents or to a color chart prepared from these standards.

In a refrigerant liquid of low water solubility, such as dichlorodifluoromethane ("Freon-12"), the formation of ice crystals with subsequent blocking of expansion valves and capillary orifices is a very serious problem. The same type of problem is encountered in automotive and aviation gasoline, with plugging of carburetor orifices. Similar problems arise in connection with the use of fuel oil. In fact, any application where ice can separate from a liquid of low water solubility causing defective operation of mechanical devices is an application for this indicator.

There are many known methods available for the determination of small amounts of water in liquids. One such method involves infrared spectrophotometry. A freezing method is described in U. S. Patent 2,145,203. There are other methods available employing conductivity devices. There are chemical methods such as reaction with phosphorous pentoxide or the Karl Fischer reagent. All of these methods require expensive equipment and the services of a skilled analyst. They are unavailable to the average refrigeration serviceman, service station attendant or aviation mechanic. Therefore, a simple and inexpensive means of water determination is in great demand.

Some simple and inexpensive humidity indicators have been developed for determining relative water content in air or other gases. In general, these indicators are based on the color change of a metal salt in passing from an anhydrous condition to a hydrated state. Such metal salts are the chlorides, bromides, sulfates, etc. of such metals as cobalt, chromium and copper. These indicators are usually used in conjunction with an air drying system to indicate when the desiccant is spent, therefore, the indicating material is nearly always deposited on some of the desiccant. The use of cobalt salts deposited on silica gel has been suggested for moisture detection in a gaseous atmosphere as in U. S. Patents 2,460,068 and 2,460,069 January 25, 1949. Since the affinity of silica gel for water is much greater than that of the cobalt salts, a great deal of water must be absorbed by the indicator before a color change occurs. Therefore, these indicators are of no value for determining low water contents of the order of 100 parts per million or less. By contrast air of 50 per cent relative humidity at 75° F. has about 10,000 parts per million of water present. A metal salt deposited on calcium sulfate has also been suggested in U. S. Patent 2,506,806. Its disadvantages are, (1) refrigerant vapor is required, (2) the refrigerant must be vented and wasted, and (3) its sensitivity is very low.

These relative humidity indicators that have been developed for air and other gases have never been suggested for the determination of water in liquids. We have discovered that the water dissolved in liquids, in which the concentration at saturation is not over about 5,000 parts per million, surprisingly bears a relationship to the concentration at saturation in the liquid. There is no teaching in the prior art that the previous test papers used as relative humidity indicators in air or gases could be used for determining water in liquids. Application of Raoult's law (see Solubility of Nonelectrolytes, 3rd ed., page 23, Reinhold), which states that the mole fraction of a component in solution is equal to the ratio of its partial vapor pressure above the solution to the saturation pressure of the pure component, leads to the conclusion that these relative humidity indicators will not work in liquids. For example, when liquid Freon 12 contains 10 parts per million of water at 80° F. the mole fraction of water in solution is 0.000067. Therefore, the partial pressure, or relative humidity, should be 0.0067 per cent. This is much too low a value for any relative humidity indicator to be effective, therefore, the observed relative humidity of about 10 per cent was an unexpected finding. We have found that the concentration of the indicator is very critical in moisture indication in liquids. In liquids, such as Freon 12, where the water solubility is extremely low, the indicator itself must have a negligible capacity for water. This eliminates such compositions as those disclosed in the U. S. Patents 2,460,068 and 2,460,069 January 25, 1949, which are indicating desiccants. These materials are satisfactory for indication in air where the water content at saturation is about 20,000 p. p. m.

The indicating material in such patents as the Howard U. S. Patent 650,149 May 22, 1900 and French Patent 884,848 (1943) is cobalt chloride. This material deposited on paper shows a color change in the neighborhood of 50 per cent relative humidity in air. This test paper is completely unsatisfactory for use in chlorinated refrigerants since the corrosion limit for refrigerants such as Freon 12 is about 15 per cent of saturation.

The present invention offers a visual method of determining the approximate dryness of chlorinated refrigerants in the liquid line of a refrigeration system. It was developed to fill a vital and long-standing need. The industry previously did not have available a simple, reliable means of determining whether equipment in the field is wet or dry. The solution to this problem is highly important because moisture is considered by many to be refrigeration's number one cause of trouble. Freeze-ups, corrosion, sludge, oil breakdown, hermetic motor burnouts, crystallization of valve reeds, and copper plating are all well-known field failures associated with excess moisture.

According to our invention, our indicating element consists of pure anhydrous cobaltous bromide deposited on white cellulosic material, such as, white unsized paper, cotton, paper pulp, woven cotton cloth and the like. We prefer to use white unsized paper, having a thickness from 0.006 to 0.008 inch, or of an average thickness of 0.007 inch. The concentration of pure anhydrous cobaltous bromide which we have found advantageous to use in uniform distribution in the cellulosic material is from 0.01 gram to 0.7 gram per cubic centimeter of the cellulosic material. Our preferred range is from about 0.03 to about 0.14 gram pure anhydrous cobaltous bromide per cubic centimeter of cellulosic material. This is equivalent to 0.2 to 1.0 gram of pure anhydrous cobaltous bromide per 400 sq. cm. of surface area of white unsized paper of average 0.007 inch thickness. Our liquid phase water indicator may be prepared, for example, by dissolving from 0.2 to 1.0 gram of pure anhydrous cobaltous bromide in 10 ml. of water and spreading this solution uniformly over an area of 400 sq. cm. of white unsized paper 0.007 inch average thickness. After drying in the air the indicator is ready for use by simply immersing the treated paper in the liquid to be tested. The paper may be placed, for example, in a small chamber provided with a window, connected in a refrigeration line so that the liquid refrigerant may flow through the chamber and any color change in the treated paper can be observed through the window.

A specific preferred range of concentration of pure anhydrous cobaltous bromide which we have found particularly advantageous is from 0.03 to 0.05 gram per cubic centimeter of white unsized cellulosic material. We prefer to use white unsized paper 0.006 to 0.008 inch thickness, but the practice of our invention is not restricted to this thickness. This preferred range of concentration can also be expressed as 0.2 to 0.4 gram pure anhydrous cobaltous bromide per 400 sq. cm. of the specified white unsized paper. When immersed in liquid halogenated refrigerants dichlorodifluoromethane, trichloromonofluoromethane, monochlorodifluoromethane and methyl chloride, this indicator shows Munsell colors of about 5.0 PB 7/6 at 10 per cent of saturation, about 5.0 P 8/2 at 20 per cent of saturation and about 5.0 RP 7/4 at 30 per cent of saturation. In the following table are given the solubilities of water in selected halogenated refrigerants at saturation at three temperatures, in parts per million:

|  | 60° F. | 80° F. | 100° F. |
| --- | --- | --- | --- |
| Dichlorodifluorothane | 58 | 98 | 165 |
| Trichloromonofluorothane | 70 | 113 | 168 |
| Monochlorodifluoromethane | 970 | 1,350 | 1,800 |
| Methyl Chloride | 1,880 | 2,550 | 3,500 |

When colors corresponding to 10, 20 or 30 percent of saturation are obtained when using this indicator in these refrigerants, it is only necessary to multiply the percent of saturation by the concentration at saturation at the temperature used to determine the unknown concentration. For example, if a color of 5.0 P 8/2 corresponding to 20 percent of saturation is obtained in liquid dichlorodifluoromethane at 80° F. the water content is about 20 parts per million. The color change of this indicator in the range of 10 to 30 percent of saturation is particularly advantageous because this is the range at which corrosion of refrigeration equipment generally begins when using these refrigerants. If more accurate determination of water is desired a series of sealed glass tubes containing our indicator and any of these halogenated refrigerants of known water contents can be prepared as comparison standards. In addition these standards can be duplicated in a color chart on paper or cardboard for convenient comparison with the test paper used.

Even though a refrigeration system is charged with refrigerant of low water content there are numerous ways in which water can enter a system. It may not be dry to begin with, the oil added may contain water, the charging lines may be damp, or some part replaced and moist air allowed to enter the system. High water content in a refrigeration system will quickly cause corrosion with subsequent failure of moving parts and formation of solids which cause plugging of valves and tubing and reduction in efficiency of heat transfer surfaces. A further objection to high water content is the formation of ice crystals at expansion valves and capillary metering devices, with resulting plugging of these devices and complete failure of the unit. Water contents as low as 25 to 50 parts per million, for example, in "Freon-12" can cause corrosion and formation of ice crystals.

Our indicator having 0.03 to 0.14 gram of pure anhydrous cobaltous bromide per cubic centimeter of cellulosic material as previously described will show a blue color in liquid "Freon-12" when the water content is 25 p. p. m. or below. When the indicator shows a definite pink color the water content is above 55 p. p. m. By using a combination of two or three paper indicators, prepared from cobalt bromide solutions between 25 and 55 p. p. m. can be determined. For example, using test papers having (a) 0.5 gram, (b) 0.75 gram, and (c) 1.00 gram of cobaltous bromide per 400 sq. cm. of average 0.007 inch thickness paper, respectively, all test papers remain blue in color in "Freon-12" containing less than 25 p. p. m. of water. In "Freon-12" containing more than 25 p. p. m. but less than 40 p. p. m. of water, the test paper (a) turned pink, while (b) and (c) remained blue. In "Freon-12" containing more than 40 p. p. m. of water but less than 55 p. p. m. of water, test papers (a) and (b) turned pink and (c) remained blue. In "Freon-12" containing more than 55 p. p. m. of water, all three test papers turned pink. Upon reducing the water content to the successive values previously indicated, the respective test papers turned to blue in reverse order previously given.

The water solubility of gasoline at room temperature is about 50 p. p. m. When this solution is cooled below 32° F. ice crystals separate. This causes plugging of carburetor jets in automobiles and airplanes. In airplanes this can be a very serious difficulty. We have found that our indicator, containing 0.5 gram of pure anhydrous cobaltous bromide per 400 sq. cm. of average 0.007 inch thickness paper, turns pink in gasoline that has more than about 25 parts per million of water and blue when the water content is below about 15 parts per million.

It will thus be apparent that our indicator has many advantages. It will indicate water concentration in liquids of low water solubilities, particularly in liquids in which the concentration of water at saturation is not over 5,000 parts per million. The indicator is based on a visible color change which an inexperienced person can easily detect. The indicator is simple and very inexpensive.

This application is a continuation-in-part of application Serial No. 355,887 filed May 18, 1953, and now forfeited.

We claim:

1. The method of determining the concentration of water in a liquid of low water solubility selected from the group consisting of dichlorodifluoromethane, trichloromonofluoromethane, monochlorodifluoromethane, methyl chloride and gasoline which comprises immersing an indicating material in the liquid, said indicating material consisting of white unsized cellulosic material having uniformly distribuited therein 0.01 to 0.7 gram of pure anhydrous cobaltous bromide per cubic centimeter of the cellulosic material and observing the color of the immersed indicating material, whereby the concentration of water in the liquid can be determined by comparing the color of the immersed indicating material with the colors of standards prepared by immersing samples of the same indicating material in the same liquid having known water contents.

2. The method of determinilng the concentration of water in a liquid of low water solubility as defined in claim 1 wherein the indicating material contains 0.03 to 0.14 gram of pure anhydrous cobaltous bromide per cubic centimeter of the cellulosic material.

3. The method of determining the concentration of water in a liquid of low water solubility as defined in claim 1 wherein the indicating material contains 0.03 to 0.05 gram of pure anhydrous cobaltous bromide per cubic centimeter of the cellulosic material.

4. The method of determining the concentration of water in a liquid of low water solubility as defined in claim 1 wherein the cellulosic material is white unsized paper having a thickness of 0.006 to 0.008 inch.

5. The method of determining the concentration of water in a liquid of low water solubility as defined in claim 1 wherein the indicating material consists of white unsized paper having a thickness of 0.006 to 0.008 inch and having uniformly distributed therein 0.2 to 1.0 gram of pure anhydrous cobaltous bromide per 400 sq. cm. of the paper.

6. The method of determining the concentration of water in a liquid of low water solubility as defined in claim 1 wherein the indicating material consists of white unsized paper having a thickness of 0.006 to 0.008 inch and having uniformly distributed therein 0.2 to 0.4 gram of pure anhydrous cobaltous bromide per 400 sq. cm. of the paper.

7. The method of determining the moisture content in liquid dichlorodifluoromethane containing less than saturating amount of moisture which comprises immersing relatively small strips of white unsized paper of average thickness of 0.007 inch having cobaltous bromide uniformly distributed through same in predetermined amounts respectively of 0.5 gram, 0.75 gram and 1.00 gram of pure anhydrous cobaltous bromide per 400 sq. cm. of paper and having a blue color in absence of moisture, and observing the color change from blue to pink in any one of said strips, whereby the moisture content in the liquid is determined from the specific concentration of cobaltous bromide in the strip in which the color change has occurred, all said strips remaining blue in color in said liquid containing less than 25 p. p. m. in water, said first paper strip changing to pink color while said second and third paper strips remain blue in said liquid containing more than 25 p. p. m. but less than 40 p. p. m. of water, said second strip changing to pink color in said liquid containing more than 40 p. p. m. but not less than 55 p. p. m. of water and said third strip changing to pink color in said liquid containing more than 55 p. p. m. of water.

8. The method of indicating the moisture content in liquid gasoline containing less than saturating amount of water which comprises immersing a strip of white unsized pape rof 0.007 average thickness having pure anhydrous cobaltous bromide uniformly distributed through same in amounts of 0.5 gram per 400 sq. cm. of the paper and having a blue color in absence of moisture, and observing the color change from blue to pink in said strip, whereby the moisture content in the gasoline is determined by the color change, said color being blue when the water content in the gasoline is below 15 p. p. m. and pink when the water content is more than 25 p. p. m.

No references cited.